(12) United States Patent
Na et al.

(10) Patent No.: US 8,085,648 B2
(45) Date of Patent: Dec. 27, 2011

(54) SERVO MASTER MAGNETICALLY TRANSFERRING SERVO PATTERNS TO MAGNETIC RECORDING MEDIUM, AND MAGNETIC TRANSFER METHOD USING THE SERVO MASTER

(75) Inventors: Kyoung-won Na, Seoul (KR); Jin-seung Sohn, Seoul (KR); Sang-chul Sul, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/497,066

(22) Filed: Jul. 2, 2009

(65) Prior Publication Data

US 2010/0002565 A1  Jan. 7, 2010

(30) Foreign Application Priority Data

Jul. 4, 2008 (KR) .................. 10-2008-0065138

(51) Int. Cl.
*G11B 7/24* (2006.01)
*G11B 5/86* (2006.01)

(52) U.S. Cl. .................. 369/275.3; 360/17; 360/15

(58) Field of Classification Search ............... 369/275.3, 369/13.01, 264, 77.2, 291, 291.1, 77.21; 360/15, 16, 17; 720/710
See application file for complete search history.

(56) References Cited

U.S. PATENT DOCUMENTS

| 6,347,016 | B1 * | 2/2002 | Ishida et al. .................. 360/17 |
| 6,804,070 | B2 * | 10/2004 | Aoki et al. .................. 360/17 |
| 6,947,231 | B2 | 9/2005 | Kamatani |
| 6,950,253 | B2 | 9/2005 | Wang et al. |
| 2007/0014920 | A1 | 1/2007 | Syms |

FOREIGN PATENT DOCUMENTS

JP  2004-296009 A  10/2004

* cited by examiner

*Primary Examiner* — Ali Neyzari
(74) *Attorney, Agent, or Firm* — Sughrue Mion, PLLC

(57) ABSTRACT

The servo master includes a membrane having a first surface and a second surface; a plurality of stamp areas which are disposed on the first surface, each of the plurality of stamp areas including a magnetic layer patterned with servo patterns to be magnetically transferred to a magnetic recording medium; and a pressing members which are disposed on the second surface, each of the plurality of pressing members being operable to apply pressure to a corresponding stamp area of the plurality of stamp areas.

20 Claims, 8 Drawing Sheets

SERVO MASTER MAGNETICALLY TRANSFERRING SERVO PATTERNS TO MAGNETIC RECORDING MEDIUM, AND MAGNETIC TRANSFER METHOD USING THE SERVO MASTER

CROSS-REFERENCE TO RELATED PATENT APPLICATION

This application claims priority from of Korean Patent Application No. 10-2008-0065138, filed on Jul. 4, 2008 in the Korean Intellectual Property Office, the disclosure of which is incorporated herein in its entirety by reference.

SUMMARY

The exemplary embodiments of the present invention provide a servo master and a magnetic transfer method using the servo master which can magnetically transfer servo patterns suitable for a high-density recording to a magnetic recording medium and has an excellent contact characteristic with respect to the magnetic recording medium when a magnetic transfer is performed.

According to an aspect of the present invention, there is provided a servo master including a membrane having a first surface and a second surface; a plurality of stamp areas formed on the first surface and each having a magnetic layer patterned with servo patterns to be magnetically transferred to a magnetic recording medium; and a plurality of pressing members formed on the second surface and for applying a pressure to the plurality of stamp areas.

The pressing members may be formed as a plurality of piezoelectric elements arranged in positions respectively corresponding to the plurality of stamp areas.

In each area between the adjacent piezoelectric elements, a supporting member may be arranged to support the pressure applied to the plurality of stamp areas when the plurality of piezoelectric elements are operated.

A deformation direction of the plurality of piezoelectric elements may be vertical or horizontal to the membrane.

Each of the plurality of piezoelectric elements may be formed as a single-layered structure or a multi-layered structure.

A buffer layer may be further formed between the membrane and the magnetic layer.

According to another aspect of the present invention, there is provided a magnetic transfer method including the operations of preparing a servo master comprising a plurality of stamp areas on which servo patterns to be magnetically transferred to a magnetic recording medium are formed; and disposing the servo master on the magnetic recording medium so that the plurality of stamp areas face a surface of the magnetic recording medium, and applying a pressure selectively to the plurality of stamp areas.

The pressure may be applied to the plurality of stamp areas by using one of a piezoelectric method and a electrostatic voltage method.

The magnetic transfer method may further include the operation of determining a degree of contact between each of the stamp areas and the surface of the magnetic recording medium, and adjusting the pressure to be applied to each of the stamp areas.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments will now be described more fully with reference to the accompanying drawings. In the drawings, like reference numerals denote like elements, and the thicknesses of layers and regions may be exaggerated for clarity.

Before describing a servo master and a method of manufacturing the same, according to exemplary embodiments of the present invention, a method of forming servo patterns on a magnetic recording medium used for a hard disk drive (HDD) will be first described with reference to FIGS. 1 and 2.

Figure 1:
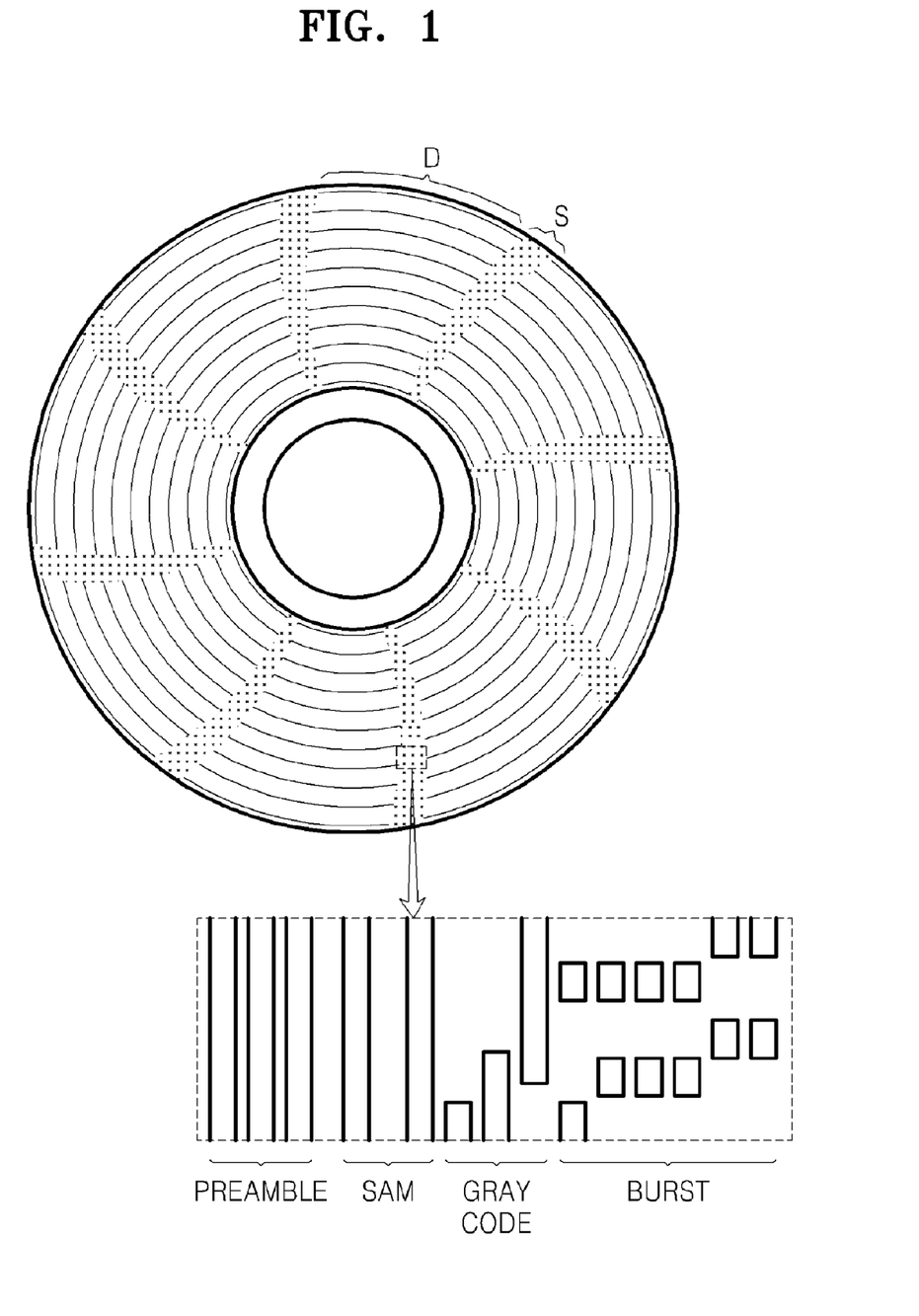
FIG. 1 illustrates a general structure of areas of a magnetic recording medium.

FIG. 1 illustrates a general structure of areas of a magnetic recording medium. The magnetic recording medium is a circular-shaped disk so that information may be recorded along a plurality of circular tracks of the disk. The areas of the magnetic recording medium are divided into a plurality of data areas D on which data is recorded and a plurality of servo areas S on which servo information about tracks is recorded. Each of the servo areas S is magnetized using specific patterns to form servo patterns thereon. Such servo patterns may include a preamble providing servo synchronization, a servo address mark (SAM) indicating a start of each of the servo areas S so as to provide synchronization for reading a following gray code providing a track identification (ID), and a burst providing information used in the calculation of a position error signal (PES) necessary for track following. The shapes of the servo patterns are not limited to the shapes shown in FIG. 1, and can be different from the ones shown in FIG. 1 according to the track. When the HDD performs recording and/or reproducing with respect to the magnetic recording medium, the HDD reads the servo information from the servo patterns of the servo areas S to perform track seeking and track following.

Figure 2:
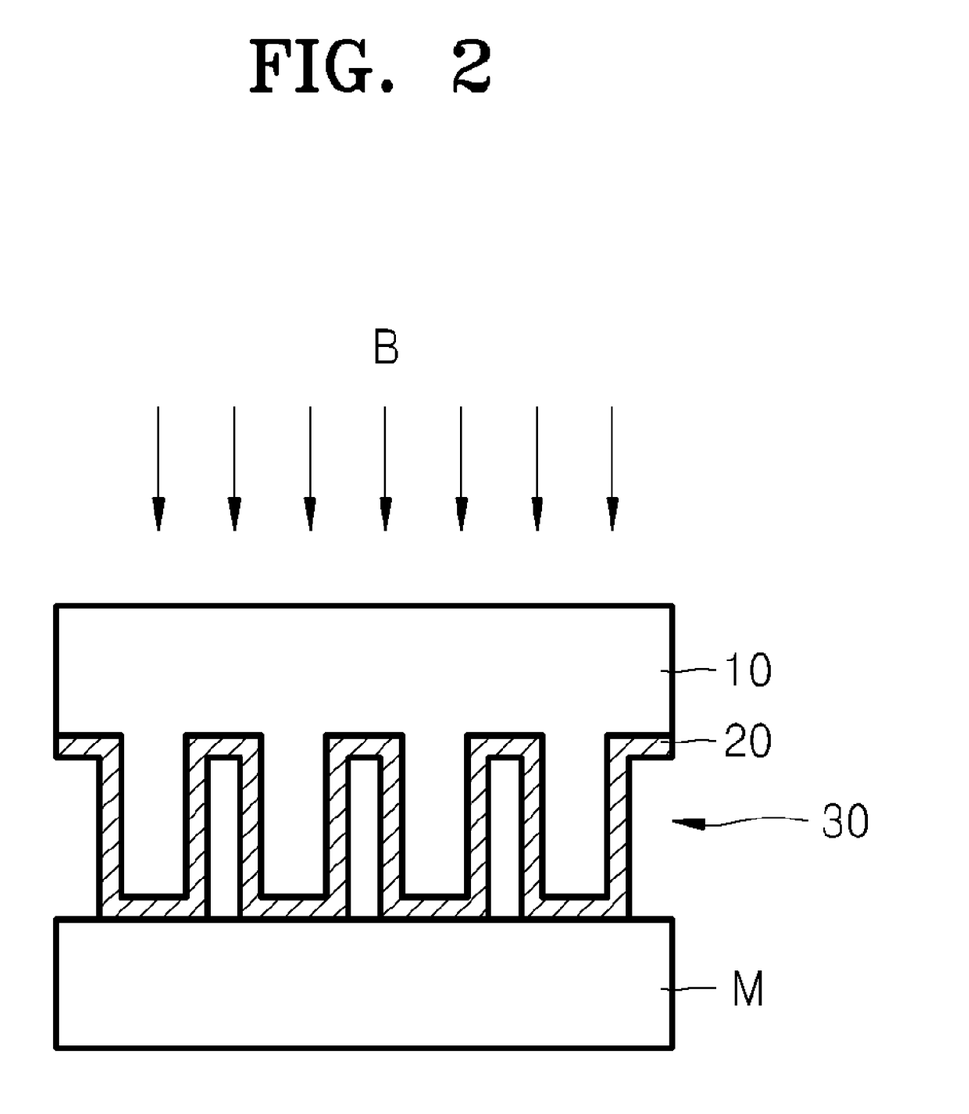
FIG. 2 is a diagram illustrating a method of magnetically transferring servo patterns to a magnetic recording medium.

FIG. 2 is a diagram illustrating a method of magnetically transferring servo patterns to a magnetic recording medium M. In order to form servo patterns on the magnetic recording medium M, a servo master 30 capable of magnetically transferring the servo patterns is used. The servo master 30 includes a substrate 10 on which the servo patterns are embossed, and a magnetic layer 20 formed of CoFe along a surface of the substrate 10 on which the servo patterns are formed. First, the servo master 30 is disposed on the magnetic recording medium M on which the servo patterns are to be formed, and then an external magnetic field B is applied thereto. The magnetic layer 20 of the servo master 30 and a recording layer of the magnetic recording medium M are magnetized by the external magnetic field B, and thus, magnetized patterns of the magnetic recording medium M have the same shapes as the embossed shapes of the servo master 30.

In the magnetic transfer of the servo patterns according to the method of FIG. 2, the magnetic layer 20 of the servo master 30 must closely contact a surface of the magnetic recording medium M. However, in general, the magnetic layer 20 of the servo master 30, and the magnetic recording medium M have similar hardness characteristics that prevent a close contact between the magnetic layer 20 and the magnetic recording medium M. If an excessive pressure is applied to closely contact the magnetic layer 20 and the magnetic recording medium M, the magnetic layer 20 and/or the magnetic recording medium M may be damaged.

In order to solve such problems, the exemplary embodiment of the present invention provides a servo master having a structure capable of minutely adjusting a degree of contact between the servo master and the magnetic recording medium M, and a magnetic transfer method using the servo master.

Figure 3A:
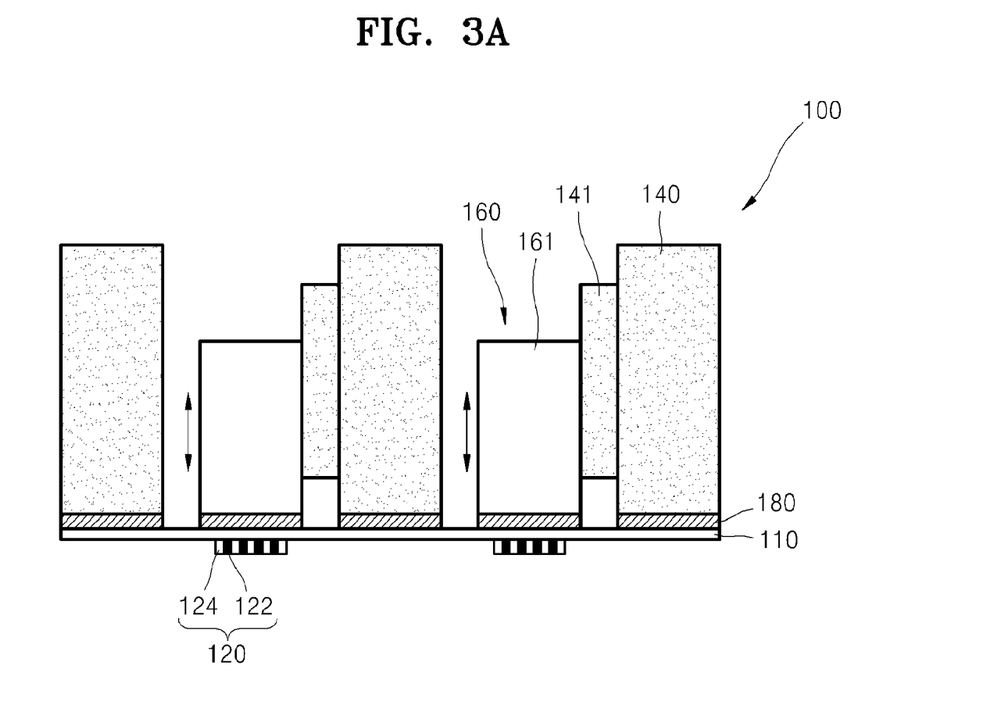
FIGS. 3A and 3B are cross-sectional views of a structure of a servo master according to an exemplary embodiment of the present invention, illustrating a state in which a pressure is not applied to a plurality of stamp areas and a state in which the pressure is applied to the stamp areas, respectively.
Figure 3B:
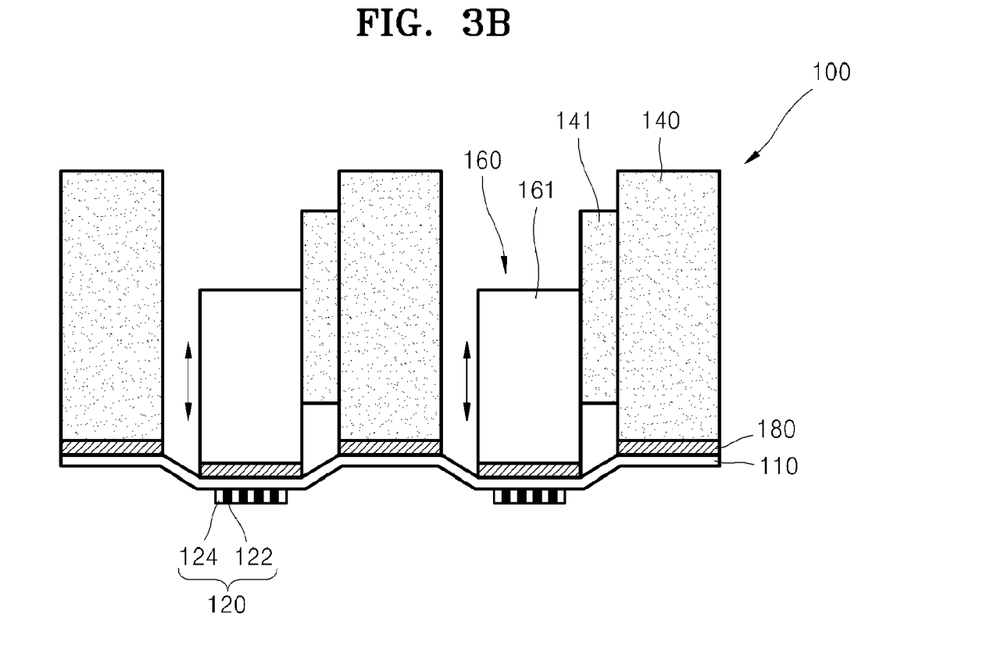

FIGS. 3A and 3B are partial cross-sectional views of a structure of a servo master 100 according to an exemplary embodiment of the present invention, illustrating a state in which a pressure is not applied to a plurality of stamp areas 120 and a state in which the pressure is applied to the stamp areas 120, respectively.

Referring to FIGS. 3A and 3B, the servo master 100 includes a membrane 110 having first and second surfaces, the stamp areas 120 formed on the first surface of the membrane 110, and a plurality of pressing members 160 for applying pressure to the stamp areas 120.

The membrane 110 may be formed of a metal material, such as Ni or polymer, that easily deforms due to an applied pressure to the stamp areas 120.

Each of the stamp areas 120 includes a magnetic layer 122 which is patterned with servo patterns to be magnetically transferred to a magnetic recording medium. Also, each of the stamp areas 120 may include a polymer layer 124 on which the servo patterns are engraved, and the magnetic layer 122 filling the inside of the engraved servo patterns. Such a structure of each of the stamp areas 120 may be formed by flat coating the polymer layer 124 on a surface of the membrane 110, by engraving the polymer layer 124 according to a nano imprint process using a nano stamp on which the servo patterns are embossed, and then by plating or depositing the magnetic layer 122 on an engraved portion of the polymer layer 124. Since the nano imprint process enables the line widths of the servo patterns of the magnetic layer 122 to be minutely realized, the nano imprint process is suitable to magnetically transfer the servo patterns to the magnetic recording medium having a high-density.

The pressing members 160 are formed on the second surface of the membrane 110 opposite to the first surface of the membrane 100 on which the stamp areas 120 are formed, so as to apply the pressure to the stamp areas 120. As one exemplary embodiment, the pressing members 160 may include a deformable member. For example, the pressing members 160 may be formed as a plurality of piezoelectric elements 161 each arranged in positions respectively corresponding to the stamp areas 120. The piezoelectric elements 161 are formed of a piezoelectric material deformed when an electric field is applied thereto. Although not illustrated in detail in FIGS. 3A and 3B, each of the piezoelectric elements 161 includes the piezoelectric material and an electrode unit for applying the electric field to the piezoelectric material. The pressing members 161 may be operable independent of one another. A voltage may be equally applied to all of the piezoelectric elements 161, or may be differently applied to each of the piezoelectric elements 161. In the case where the piezoelectric elements 161 are individually operated is advantageous in that a degree of a pressure to be applied may be adjusted for each of the stamp areas 120. Also, the piezoelectric elements 161 may be formed as a single-layered structure or a multi-layered structure. The multi-layered structure is advantageous in that the piezoelectric elements 161 may be operated at a low voltage. In the current exemplary embodiment of the present invention, a deformation direction, as denoted by the arrows shown in FIGS. 3A and 3B, of the piezoelectric material in the piezoelectric elements 161 is vertical to the membrane 110. In other words, when the electric field is applied to the piezoelectric elements 161, the piezoelectric elements deform in a direction perpendicular to the membrane 110. Thus, according to a push mode operation, the piezoelectric elements 161 apply the pressure to the stamp areas 120 by pushing the membrane 110 downward.

In each area between the adjacent piezoelectric elements 161, a plurality of first supporting members 140 are arranged to support the pressure applied to the stamp areas 120 when the piezoelectric elements 161 are operated. Also, in order to support the push mode operation of the piezoelectric elements 161, a plurality of intermediate supporting members 141 are further arranged to individually contact a side surface of each of the piezoelectric elements 161 and a side surface of each of the first supporting members 140, respectively. In addition, the shapes and positions of the supporting members 140 and 141 are not limited to those shown in FIGS. 3A and 3B, and thus, any shapes able to bend the membrane 110 downward, according to the push mode operation of the piezoelectric elements 161, may be used.

A substrate layer 180 can be arranged below each of the first supporting members 140, respectively, to support the membrane 110 when the stamp areas 120 are formed on the membrane 110 which is thin. Portions of the substrate layer 180, each corresponding to both side ends of each of the stamp areas 120, are etched to enable the membrane 110 to be easily bent when the piezoelectric elements 161 are operated.

Since FIGS. 3A and 3B illustrate only a part of the servo master 100, the stamp areas 120, covered respectively by the piezoelectric elements 161, correspond to areas capable of magnetically transferring servo patterns to some of the servo areas S as illustrated in FIG. 1. That is, servo patterns formed in one of the stamp areas 120 may be magnetically transferred to the servo areas S of a track or to the servo areas S of a plurality of tracks. Alternatively, servo patterns formed in one of the stamp areas 120 may be magnetically transferred only to a part of the servo patterns corresponding to the servo areas S of a track.

Figure 4A:
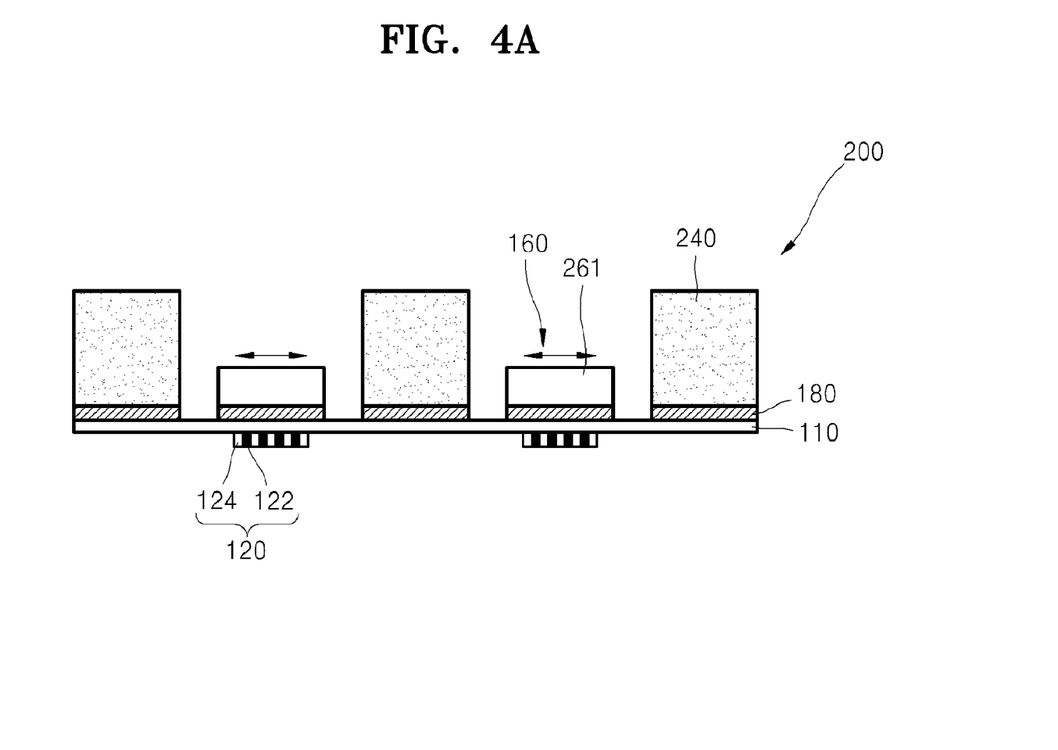
FIGS. 4A and 4B are cross-sectional views of a structure of a servo master according to another exemplary embodiment of the present invention, illustrating a state in which a pressure is not applied to a plurality of stamp areas and a state in which the pressure is applied to the stamp areas, respectively.
Figure 4B:
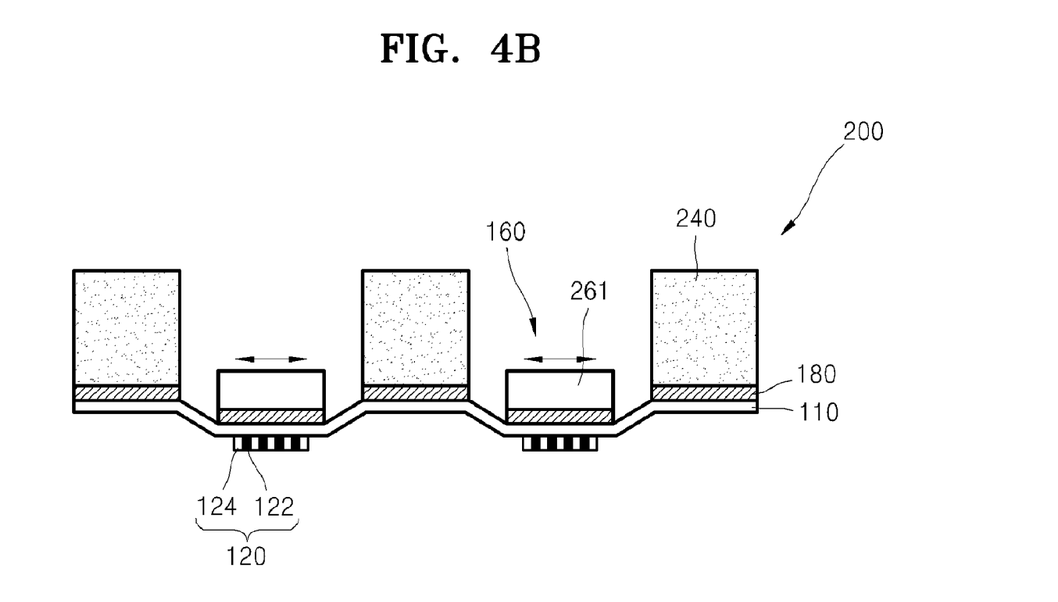

FIGS. 4A and 4B are cross-sectional views of a structure of a servo master 200 according to another exemplary embodiment of the present invention, and illustrate a state in which a pressure is not applied to a plurality of stamp areas 120 and a state in which the pressure is applied to the stamp areas 120, respectively.

The servo master 200 includes a membrane 110, the stamp areas 120 formed on a surface of the membrane 110, and a plurality of pressing members 160 for applying a pressure to the stamp areas 120. In the current exemplary embodiment of the present invention, the pressing members 160 are formed as a plurality of piezoelectric elements 261 which are deformed horizontal to the membrane 110, as denoted by the arrows shown in FIGS. 4A and 4B. In other words, when the electric field is applied to the piezoelectric elements 261, the piezoelectric elements are deformed in a direction parallel to the membrane 110.

In each area between the adjacent piezoelectric elements 261, a supporting member 240 is arranged to support the pressure applied to the stamp areas 120 when the piezoelectric elements 261 are operated.

According to a bending mode operation, the piezoelectric elements 261 apply the pressure to the stamp areas 120 by pushing the membrane 110 downward. The servo master 200 having the aforementioned structure may be advantageous in that a total thickness of the servo master 200 may be less than that of the servo master 100 described with reference to FIGS. 3A and 3B.

Figure 5A:
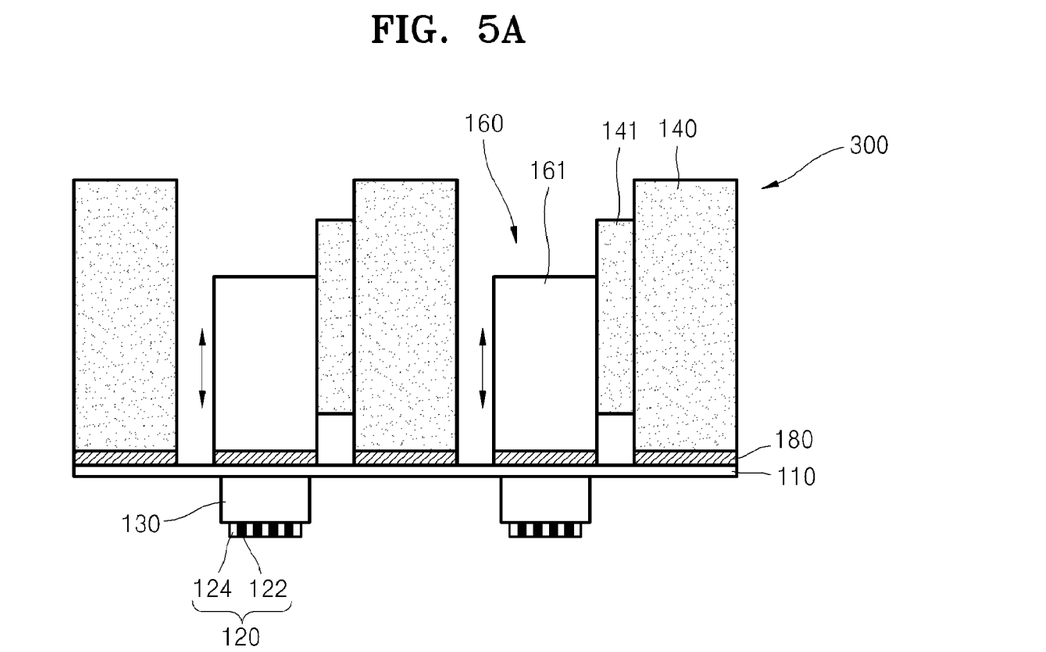
FIGS. 5A and 5B are cross-sectional views of a structure of a servo master according to another exemplary embodiment of the present invention, illustrating a state in which a pressure is not applied to a plurality of stamp areas and a state in which the pressure is applied to the stamp areas, respectively.
Figure 5B:
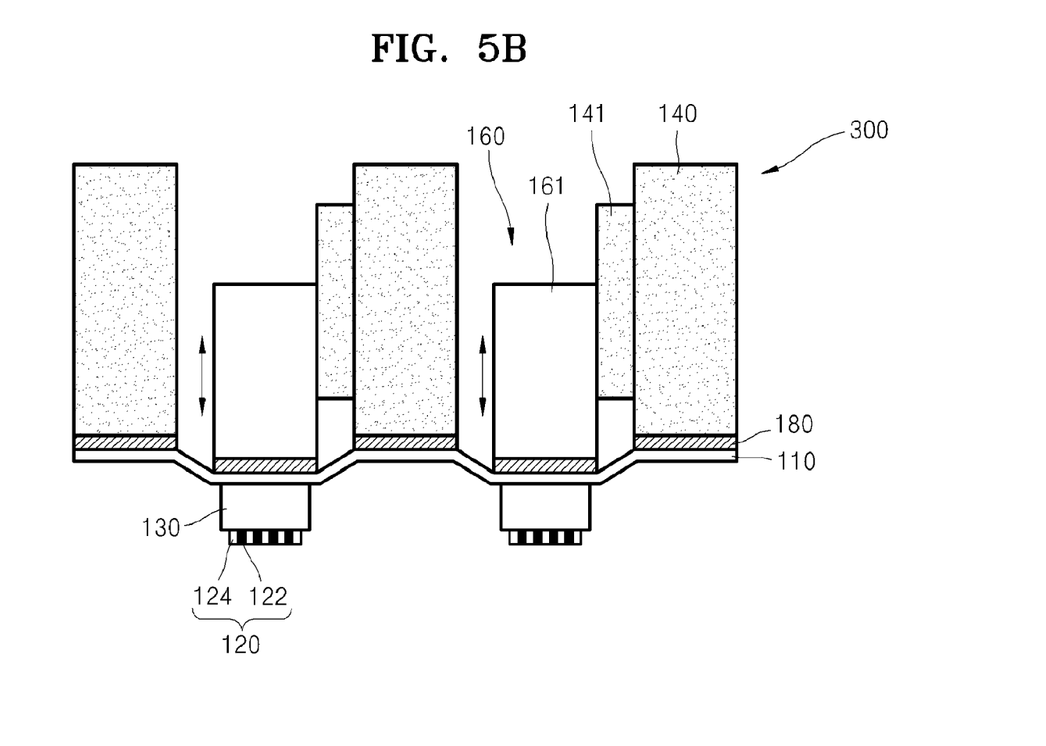

FIGS. 5A and 5B are cross-sectional views of a structure of a servo master 300 according to another exemplary embodiment of the present invention, and illustrate a state in which a pressure is not applied to a plurality of stamp areas 120 and a state in which the pressure is applied to the stamp areas 120, respectively.

The servo master 300, according to the current exemplary embodiment of the present invention, is different from the servo master 100 described with reference to FIGS. 3A and 3B in that a buffer layer 130 is further formed between a membrane 110 and the stamp areas 120. Thus, hereinafter, only a difference thereof will now be described.

The buffer layer 130 is arranged therebetween to enable the stamp areas 120 to more closely contact a magnetic recording medium when a magnetic transfer is performed. Also, the buffer layer 130 may be formed of a functional material having an excellent characteristic in facilitating a contact or facilitating a magnetic transfer, and thus, a magnetic transfer performance may be improved.

The buffer layer 130 may be formed of a material softer than that of a magnetic layer 122. Thus, in the present exemplary embodiment, a mechanical shock may be prevented, and adhesion to the magnetic recording medium may be much improved when the magnetic transfer is performed. The buffer layer 130 may be formed of a material such as resin, polymer, and rubber. Also, the buffer layer 130 may be formed of a magnetic material to facilitate the magnetic transfer of the patterns of the magnetic layer 122, and examples of the magnetic material forming the buffer layer 130 may be CoFe, CoNiFe, or NiFe.

Figure 6A:
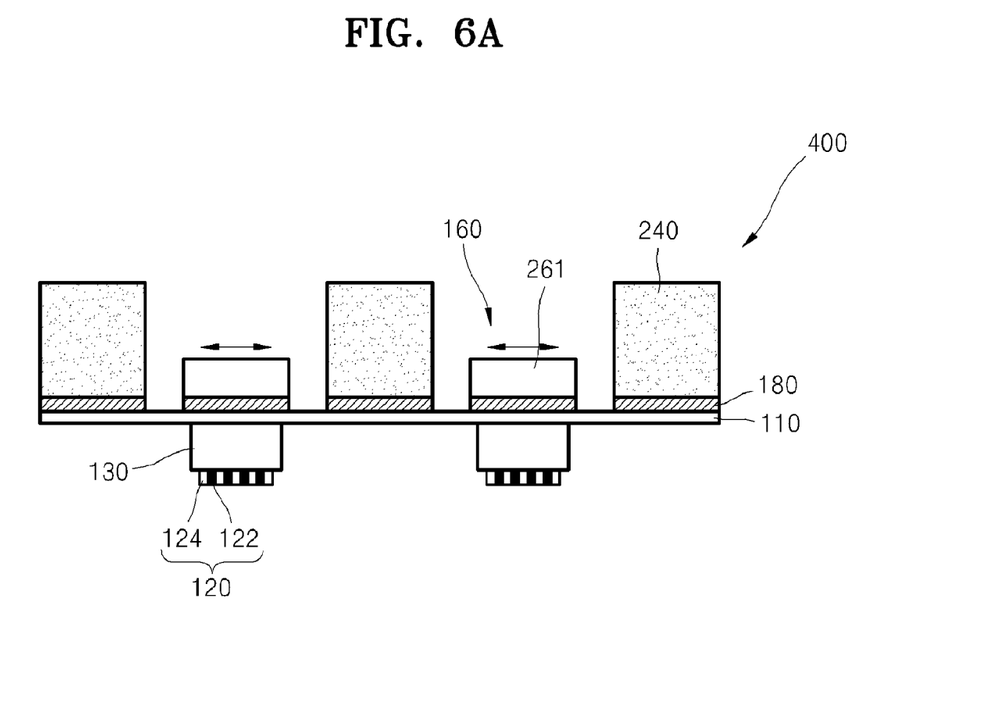
FIGS. 6A and 6B are cross-sectional views of a structure of a servo master according to another exemplary embodiment of the present invention, illustrating a state in which a pressure is not applied to a plurality of stamp areas and a state in which the pressure is applied to the stamp areas, respectively.
Figure 6B:
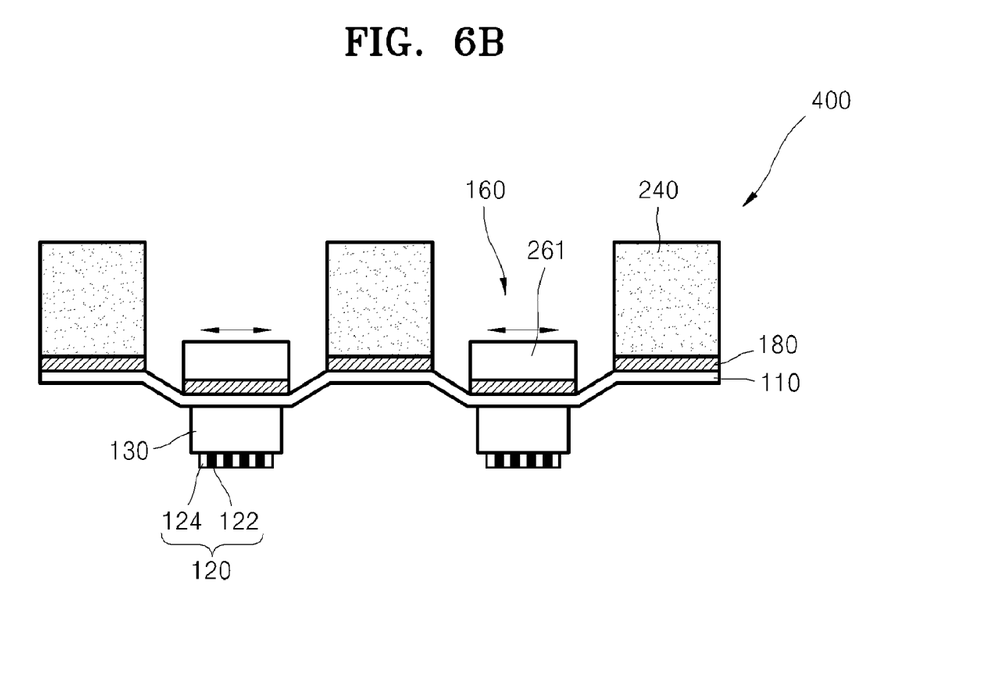

FIGS. 6A and 6B are cross-sectional views of a structure of a servo master 400 according to another exemplary embodiment of the present invention, and illustrates a state in which a pressure is not applied to a plurality of stamp areas 120 and a state in which the pressure is applied to the stamp areas 120, respectively.

The servo master 400 according to the current exemplary embodiment of the present invention is different from the servo master 200 described with reference to FIGS. 4A and 4B in that a buffer layer 130 is further formed between a membrane 110 and the stamp areas 120. The buffer layer 130 is substantially the same as that described with reference to FIGS. 5A and 5B. That is, the servo master 400 has the structure in which a plurality of piezoelectric elements 261 apply the pressure to the stamp areas 120 by pushing the membrane 110 downward, according to a bending mode operation, so that a total thickness of the servo master 400 may be reduced as compared to that of the servo master 300. Also, the servo master 400 includes the buffer layer 130 to more closely contact a magnetic recording medium. By adequately selecting a material to form the buffer layer 130, the servo master 400 may perform a more effective magnetic transfer.

As described above, the servo masters 100, 200, 300, and 400, according to the exemplary embodiments of the present invention, have structures by which the servo masters 100, 200, 300, and 400 may more closely contact the magnetic recording medium when the magnetic transfer is performed. Also, only the stamp areas 120 of the servo masters 100, 200, 300, and 400 contact the magnetic recording medium, and the remaining portions of the servo masters 100, 200, 300, and 400, except for the stamp areas 120, do not contact the magnetic recording medium. As such, it is possible to reduce a mechanical damage or a surface contamination.

Figure 7A:
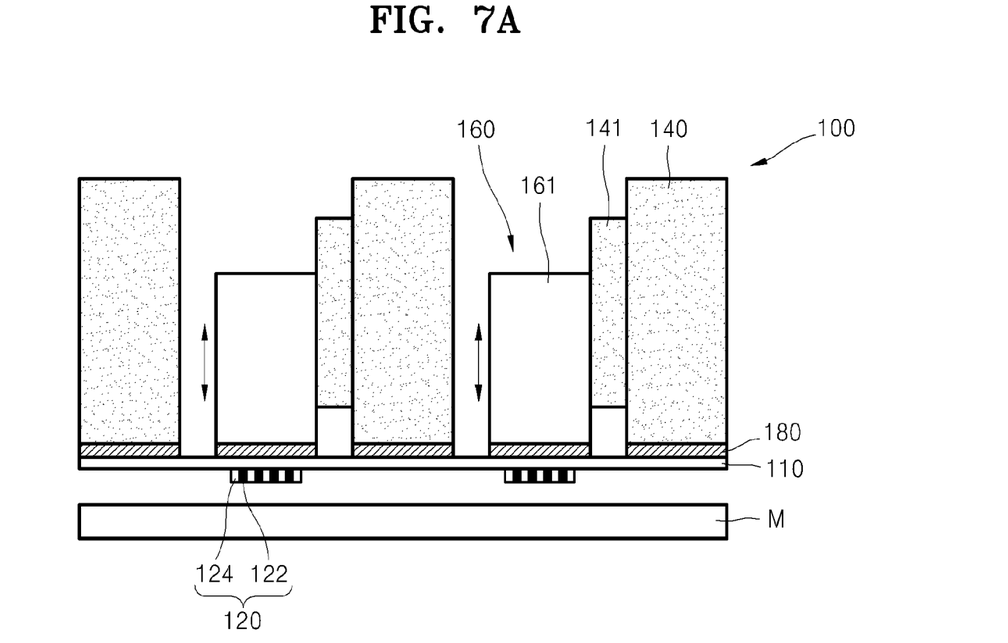
FIGS. 7A through 7C illustrate a magnetic transfer method performed by the servo master of FIGS. 3A and 3B, according to an exemplary embodiment of the present invention.
Figure 7B:
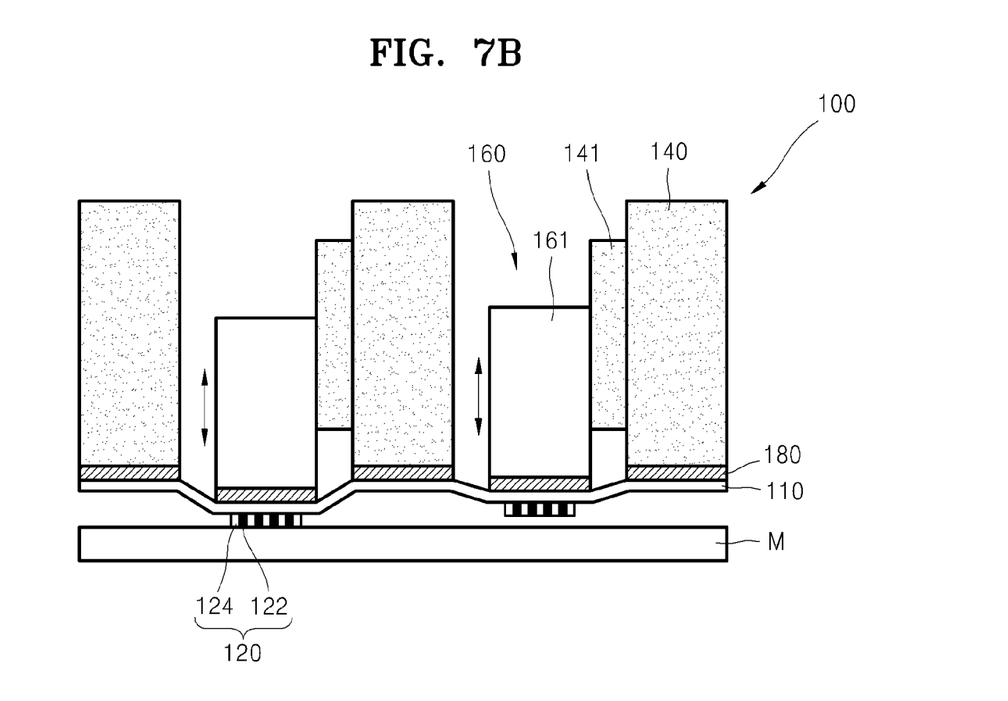
Figure 7C:
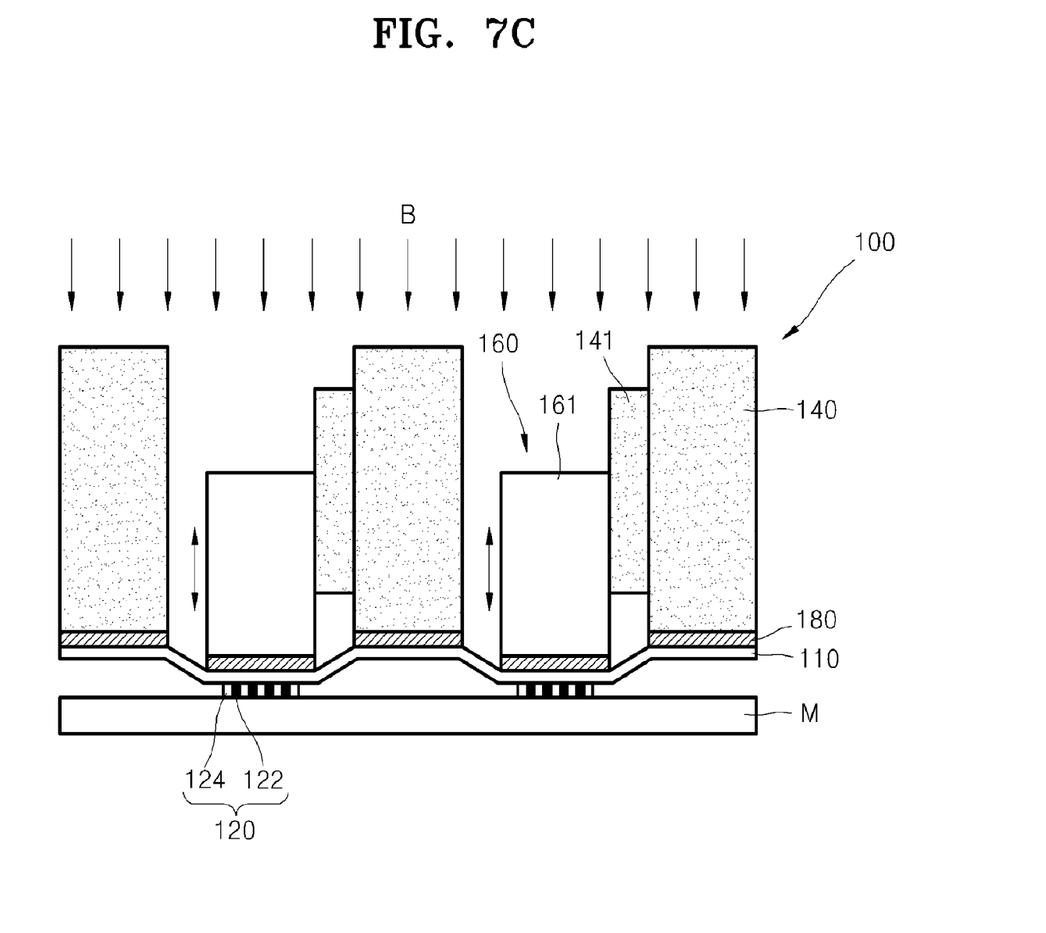

FIGS. 7A through 7C illustrate a magnetic transfer method performed by the servo master 100 of FIGS. 3A and 3B, according to an exemplary embodiment of the present invention.

Referring to FIG. 7A, the servo master 100, which includes the plurality of stamp areas 120 on which servo patterns to be magnetically transferred to a magnetic recording medium M are formed, is prepared and disposed on the magnetic recording medium M. Referring to FIGS. 7A through 7C, the servo master 100 described with reference to FIGS. 3A and 3B is used to perform the method, but the present invention is not limited thereto. That is, it is possible to perform the method by the servo masters 200, 300, and 400, according to the other exemplary embodiments of the present invention, or to use a servo master having a structure by which the magnetic transfer method can be performed.

In general, the magnetic recording medium M is formed as a multi-layered structure having a underlayer and a recording layer. A recording layer which is disposed in an upper portion of the magnetic recording medium M may be formed of a Co alloy or a Fe alloy each having a high perpendicular magnetic anisotropy. For a magnetic transfer, the stamp areas 120 of the servo master 100 must contact with a surface of the magnetic recording medium M to magnetize the recording layer of the magnetic recording medium M.

FIG. 7B illustrates a status in which the pressing members 160 apply a pressure to the stamp areas 120 according to a electrostatic voltage method or a piezoelectric method. Referring to FIGS. 7A through 7C, the plurality of piezoelectric elements 161 are used as the pressing members 160. In the case where the electrostatic voltage method is used, the electrode may be formed on a portion of the membrane 110 to generate an electrostatic attractive force between the electrode and the magnetic recording medium M, wherein the portion corresponds to each of the stamp areas 120.

When a voltage is applied to each of the piezoelectric elements 161, the piezoelectric elements 161 are deformed to push the membrane 110 downward so that the stamp areas 120 contact the surface of the magnetic recording medium M. Since the piezoelectric elements 161 are formed only on portions of the membrane 110 to correspond to the stamp areas 120, the remaining portions of the servo master 100, other than the stamp areas 120, do not contact the surface of the magnetic recording medium M. Since the piezoelectric elements 161 deform independent of one another, it is apparent that the piezoelectric elements 161 may be deformed differently from each other such that a degree of contact between the stamp areas 120 and the magnetic recording medium M varies. That is, the magnetic transfer method, according to the current exemplary embodiment of the present invention, may determine the degree of contact between the stamp areas 120 and the surface of the magnetic recording medium M, and accordingly, may adjust a pressure to be applied to each of the stamp areas 120. In order to adjust the degree of contact between the stamp areas 120 and the magnetic recording medium M, a voltage that is to be applied to the piezoelectric elements 161 is adjusted to control a degree of deformation of the piezoelectric elements 161. The stamp areas 120 may have a small difference in height according to a surface state of each of the stamp areas 120. In this case, even though a voltage is equally applied to the stamp areas 120, the degree of contact between each of the stamp areas 120 and the surface of the magnetic recording medium M may be different.

As illustrated in FIG. 7C, after all of the stamp areas 120 contact the surface of the magnetic recording medium M, an external magnetic field B is applied thereto. For the application of the external magnetic field B, an electromagnet device (not shown) may be disposed to form an N pole and an S pole respectively on an upper part and a lower part of a structure in which the servo master 100 contacts the magnetic recording medium M, and then the external magnetic field B may be applied in a direction as denoted by the arrow shown in FIG. 7C. As such, according to the patterns of the magnetic layer 122 formed in the stamp areas 120, servo patterns are magnetically transferred to the magnetic recording medium M.

The aforementioned operations of the magnetic transfer method, in particular, the operation of disposing the servo master 100 on the magnetic recording medium M, and the operation of applying the pressure to the stamp areas 120 may be performed in a vacuum chamber, likewise to those of a general magnetic transfer method. In this case, it is possible to determine the degree of contact between each of the stamp areas 120 and the surface of the magnetic recording medium M, in a vacuum state, and to operate only some of the piezoelectric elements 161 which correspond to some of the stamp areas 120 and have a low degree of contact, so the low degree of contact increase to high.

According to the current exemplary embodiment of the present invention, the magnetic transfer method allows only the stamp areas of the servo master to contact the surface of the magnetic recording medium, thereby enabling the servo master to magnetically transfer high-quality servo patterns to the magnetic recording medium effectively.

While this invention has been particularly shown and described with reference to exemplary embodiments thereof, it will be understood by one of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A servo master comprising:
   a membrane having a first surface and a second surface;
   a plurality of stamp areas which are disposed on the first surface, each of the plurality of stamp areas including a magnetic layer patterned with servo patterns to be magnetically transferred to a magnetic recording medium; and
   a plurality of pressing members which are disposed on the second surface, each of the plurality of pressing members being operable to apply pressure to a corresponding stamp area of the plurality of stamp areas.

2. The servo master of claim 1, wherein the plurality of pressing members comprise a plurality of piezoelectric elements arranged in positions on the second surface respectively corresponding to the plurality of stamp areas.

3. The servo master of claim 2, further comprising a plurality of supporting members which are disposed between adjacent ones of piezoelectric elements and support the plurality of stamp areas when the plurality of piezoelectric elements are operated to apply pressure to the plurality of stamp areas.

4. The servo master of claim 3, wherein the plurality of piezoelectric elements are deformable in a direction perpendicular to the membrane.

5. The servo master of claim 4, wherein each of the plurality of supporting members is arranged to contact a side surface of an adjacent piezoelectric element of the plurality of piezoelectric elements.

6. The servo master of claim 3, wherein the plurality of piezoelectric elements are deformable in a direction parallel to the membrane.

7. The servo master of claim 2, wherein each of the plurality of piezoelectric elements is formed as a single-layered structure or a multi-layered structure.

8. The servo master of claim 2, wherein a buffer layer is formed between the membrane and the magnetic layer of the each of the plurality of stamp areas.

9. The servo master of claim 8, wherein the buffer layer is formed of a material that is softer than a material of the magnetic layer.

10. The servo master of claim 9, wherein the buffer layer is formed of one material selected from the group consisting of resin, polymer, and rubber.

11. The servo master of claim 8, wherein the buffer layer is formed of a magnetic material.

12. A magnetic transfer method comprising:
    preparing a servo master comprising a plurality of stamp areas which are disposed on a first surface of a membrane, each of the plurality of stamp areas including a magnetic layer patterned with servo patterns to be magnetically transferred to a magnetic recording medium; and
    disposing the servo master on the magnetic recording medium so that the plurality of stamp areas face a surface of the magnetic recording medium; and
    selectively applying pressure to the plurality of stamp areas.

13. The magnetic transfer method of claim 12, wherein the servo master comprises a plurality of pressing members which are disposed on a second surface of the membrane, and each of the plurality of pressing members being selectively operable to apply pressure to a corresponding stamp area of the plurality of stamp areas.

14. The magnetic transfer method of claim 13, wherein the selectively applying pressure to the plurality of stamp areas comprises selectively applying pressure to the plurality of stamp areas via the plurality of pressing members by using one of a piezoelectric method and a electrostatic voltage method.

15. The magnetic transfer method of claim 14, further comprising determining a degree of contact between each of the stamp areas and the surface of the magnetic recording medium, and adjusting the pressure to be applied to each of the stamp areas.

16. The magnetic transfer method of claim 12, wherein the disposing the servo master on the magnetic recording medium is performed in a vacuum chamber.

17. A servo master for magnetically transferring a servo pattern to a magnetic recording medium, the servo master comprising:
- a membrane having a first surface and a second surface parallel to the first surface;
- a plurality of first supporting members disposed on the second surface of the membrane and spaced from one another;
- a plurality of stamp areas disposed on the first surface of the membrane; and
- a plurality of pressing members which are disposed on the second surface of the membrane between the plurality of first supporting members, wherein each of the plurality of pressing members is aligned with a corresponding stamp area of the plurality of stamp areas and is independently operable to move the corresponding stamp area by deforming the membrane.

18. The servo master of claim 17, wherein each of the pressing members comprises a piezoelectric element that deforms when an electric field is applied to the piezoelectric element.

19. The servo master of claim 18, wherein the piezoelectric element deforms in a direction parallel to the membrane or in a direction perpendicular to the membrane.

20. The servo master of claim 18, further comprising a plurality of second supporting member interposed between the plurality of first supporting members and the plurality of pressing members, each of the plurality of second supporting members contacting a side surface of a corresponding first supporting member of the plurality of first supporting members and a side surface of a corresponding pressing member of the plurality of pressing members.

* * * * *